United States Patent
Henttonen et al.

(10) Patent No.: US 10,165,489 B2
(45) Date of Patent: Dec. 25, 2018

(54) NETWORK SELECTION

(71) Applicant: AVAGO TECHNOLOGIES INTERNATIONAL SALES PTE. LIMITED

(72) Inventors: Tero Heikki Matti Henttonen, Espoo (FI); Jari Jaakko Isokangas, Tampere (FI); Kaisu Maria Iisakkila, Espoo (FI); Samuli Heikki Turtinen, Ii (FI)

(73) Assignee: AVAGO TECHNOLOGIES INTERNATIONAL SALES PTE. LIMITED, Singapore (SG)

( * ) Notice: Subject to any disclaimer, the term of this patent is extended or adjusted under 35 U.S.C. 154(b) by 148 days.

(21) Appl. No.: 14/160,021

(22) Filed: Jan. 21, 2014

(65) Prior Publication Data

US 2014/0219253 A1    Aug. 7, 2014

(30) Foreign Application Priority Data

Jan. 18, 2013    (GB) .................................. 1300965.9

(51) Int. Cl.
*H04W 4/00*       (2018.01)
*H04W 36/30*    (2009.01)
(Continued)

(52) U.S. Cl.
CPC .......... *H04W 36/30* (2013.01); *H04W 36/22* (2013.01); *H04W 36/14* (2013.01); *H04W 48/18* (2013.01); *H04W 48/20* (2013.01); *H04W 88/06* (2013.01)

(58) Field of Classification Search
CPC ..... H04W 36/22; H04W 36/30; H04W 36/14; H04W 48/18; H04W 48/20; H04W 88/06
(Continued)

(56) References Cited

U.S. PATENT DOCUMENTS

2010/0323698 A1    12/2010  Rune et al.
2011/0222523 A1     9/2011  Fu et al.
(Continued)

FOREIGN PATENT DOCUMENTS

CN    102812758 A    12/2012
WO    2012112571      8/2012

OTHER PUBLICATIONS

Inter-Digital Communications, "Use case for UE based and network based offload based on user plane congestion in RAN", Jul. 30, 2012 (From Applicant's IDS field on Apr. 30, 2018) (Year: 2012).*
(Continued)

*Primary Examiner* — Mang Hang Yeung
(74) *Attorney, Agent, or Firm* — Xsensus, LLP

(57) ABSTRACT

Embodiments comprise measures, including methods, apparatus and computer program products, for use in access network selection in a telecommunications system. The telecommunications system comprises, at least, a mobile telephony radio access network. At one or more network nodes of the mobile telephony radio access network a preference, to offload at least some data communication in the mobile telephony radio access network to a further radio access network other than the mobile telephony radio access network, is identified. In response to this identification, an indication of the identified offloading preference is caused to be transmitted, via the mobile telephony radio access network, to at least one user equipment.

19 Claims, 3 Drawing Sheets

(51) Int. Cl.
  *H04W 36/22*  (2009.01)
  *H04W 36/14*  (2009.01)
  *H04W 48/18*  (2009.01)
  *H04W 48/20*  (2009.01)
  *H04W 88/06*  (2009.01)

(58) Field of Classification Search
  USPC .................................................. 370/229–237
  See application file for complete search history.

(56) References Cited

U.S. PATENT DOCUMENTS

| | | | |
|---|---|---|---|
| 2011/0320588 A1 | 12/2011 | Raleigh | |
| 2013/0242965 A1* | 9/2013 | Horn | H04W 24/10 370/338 |
| 2013/0308445 A1* | 11/2013 | Xiang | H04W 28/0231 370/230 |
| 2014/0040504 A1* | 2/2014 | Gupta | H04L 45/28 709/244 |
| 2014/0064068 A1* | 3/2014 | Horn | H04W 28/0289 370/230 |
| 2014/0092731 A1* | 4/2014 | Gupta | H04L 1/1864 370/229 |
| 2014/0133294 A1* | 5/2014 | Horn | H04W 28/0247 370/230 |
| 2014/0133298 A1* | 5/2014 | Han | H04W 28/0289 370/230 |

OTHER PUBLICATIONS

3GPP TS 24.312 V10.5.0 (Mar. 2012) Technical Specification Group Core Network and Terminals; Access Network Discovery and Selection Function (ANDSF) Management Object (MO) Release 10 (155 pages).

RP-122038;3GPP TSG-RAN Meeting #58;Barcelona, Spain; Dec. 4-7, 2012; Intel Corporation; New Study Item Proposal on WLAN/3GPP Radio Interworking Approval; Agenda Item 13.2 (6 pages).

Office Action issued in corresponding Chinese Application No. 20140023568.5 dated Apr. 2, 2018.

InterDigital Communications, "Use case for UE based and network based traffic offload based on use plane congestion in the RAN," 3GPP TSG-SA WG1 #59, Chicago, Jul. 30-Aug. 3, 2012.

* cited by examiner

NETWORK SELECTION

TECHNICAL FIELD

The present disclosure relates to access network selection in a telecommunications system, and in particular, but not exclusively, to access network selection in a telecommunications system comprising at least one mobile telephony radio access network and at least one radio access network other than the mobile telephony radio access network.

BACKGROUND

Wireless Local Area Network (WLAN) interworking and integration is currently supported at the Core Network (CN) level, including both seamless and non-seamless mobility to WLAN. However, as operator controlled WLAN deployments become more common and WLAN usage increases, Radio Access Network (RAN) level enhancements for WLAN interworking can improve user experience, provide more operator control and better access network utilization to reduce Operational Expenditure (OPEX).

RAN level 3rd Generation Partnership Project (3GPP)/ WLAN interworking was proposed by Intel™ to 3GPP Technical Specification Groups (TSG) RA #58 with wide support of other companies including several operators as well as user equipment (UE) and network vendors (see RP-122038, entitled "New Study Item Proposal on WLAN/ 3GPP Radio Interworking").

In the Long Term Evolution (LTE) and Universal Mobile Telecommunications System (UMTS) standards, CN based approaches have been identified to balance load. These approaches often involve intra-Radio Access Technology (RAT) or inter-RAT handovers. Alternatively, a network may simply limit the access of certain user equipment (UE) to network resources, i.e. utilizing access class barring (ACB).

The $3^{rd}$ Generation Partnership Project Technical Specification (3GPP TS) 24.312 describes an Access Network Discovery and Selection Function (ANDSF), located within the CN. The ANDSF is intended to provide an Inter-System Routing Policy (ISRP) to the UE for offloading. The ISRP may include parameters such as cellular network topology based location (serving network, location area, cell ID), geo-location date and time of day, Access Point Name (APN), IP address type, IP address and port number.

While these 3GPP CN based solutions enable UEs to offload data connections to non-3GPP access network; the UE controls whether to trigger usage of these offloading methods. As the UE is not made aware of the load situation within a 3GPP network, it cannot know when it would be beneficial from the network point of view to trigger offloading to non-3GPP access networks even if one would be available nearby.

Therefore, there is a desire for improved measures for use in access network selection.

SUMMARY

According to a first aspect of the present invention, there is provided a method for use in access network selection in a telecommunications system, said telecommunications system comprising at least a mobile telephony radio access network, the method for use in a network node of the mobile telephony radio access network, the method comprising:

identifying a preference to offload at least some data communication in the mobile telephony radio access network to a further radio access network other than the mobile telephony radio access network; and in response to the identification, causing transmittal, via the mobile telephony radio access network, of an indication of the identified offloading preference to at least one user equipment.

According to a second aspect of the present invention, there is provided apparatus for use in access network selection in a telecommunications system, said telecommunications system comprising at least a mobile telephony radio access network, the apparatus configured for use in a network node of the mobile telephony radio access network, the apparatus comprising a processing system configured to cause the apparatus to:

identify a preference to offload at least some data communication in the mobile telephony radio access network to a further radio access network other than the mobile telephony radio access network; and in response to the identification, cause transmittal, via the mobile telephony radio access network, of an indication of the identified offloading preference to at least one user equipment.

According to a third aspect of the present invention, there is provided a method for use in access network selection in a telecommunications system, said telecommunications system comprising at least a mobile telephony radio access network, the method for use in a user equipment within the mobile telephony radio access network, the method comprising:

receiving an indication of an identified offloading preference to offload at least some data communication in the mobile telephony radio access network to a further radio access network other than the mobile telephony radio access network, the indication of the identified offloading preference having been identified by and received from one or more network nodes of the mobile telephony radio access network.

According to a fourth aspect of the present invention, there is provided apparatus for use in access network selection in a telecommunications system, said telecommunications system comprising at least a mobile telephony radio access network, the apparatus configured for use in a user equipment within the mobile telephony radio access network, the apparatus comprising a processing system configured to cause the apparatus to:

receive an indication of an identified offloading preference to offload at least some data communication in the mobile telephony radio access network to a further radio access network other than the mobile telephony radio access network, the indication of the identified offloading preference having been identified by and received from one or more network nodes of the mobile telephony radio access network.

According to a fifth aspect of the present invention, there is provided a method for use in access network selection in a telecommunications system, said telecommunications system comprising, at least, a mobile telephony radio access network and at least one user equipment, the method comprising:

determining a prioritization of at least a first part of at least some data communication in the mobile telephony radio access network for offloading to a further radio access network other than the mobile telephony radio access network over at least a second part of the at least some data communication; and providing data indicative of the prioritization to one or more network nodes of the mobile telephony radio access network.

According to a sixth aspect of the present invention, there is provided apparatus for use in access network selection in a telecommunications system, said telecommunications system comprising, at least, a mobile telephony radio access network and at least one user equipment, the apparatus comprising a processing system configured to cause the apparatus to:

determine a prioritization of at least a first part of at least some data communication in the mobile telephony radio access network for offloading to a further radio access network other than the mobile telephony radio access network over at least a second part of the at least some data communication; and provide data indicative of the prioritization to one or more network nodes of the mobile telephony radio access network.

According to a seventh aspect of the present invention, there is provided a computer program product comprising a set of instructions which, when executed by a computerised device, is arranged to cause the device to carry out a method according to the first, third or fifth aspects of the present invention.

Further features and advantages of the invention will become apparent from the following description of preferred embodiments of the invention, given by way of example only, which is made with reference to the accompanying drawings.

DETAILED DESCRIPTION

Figure 1:
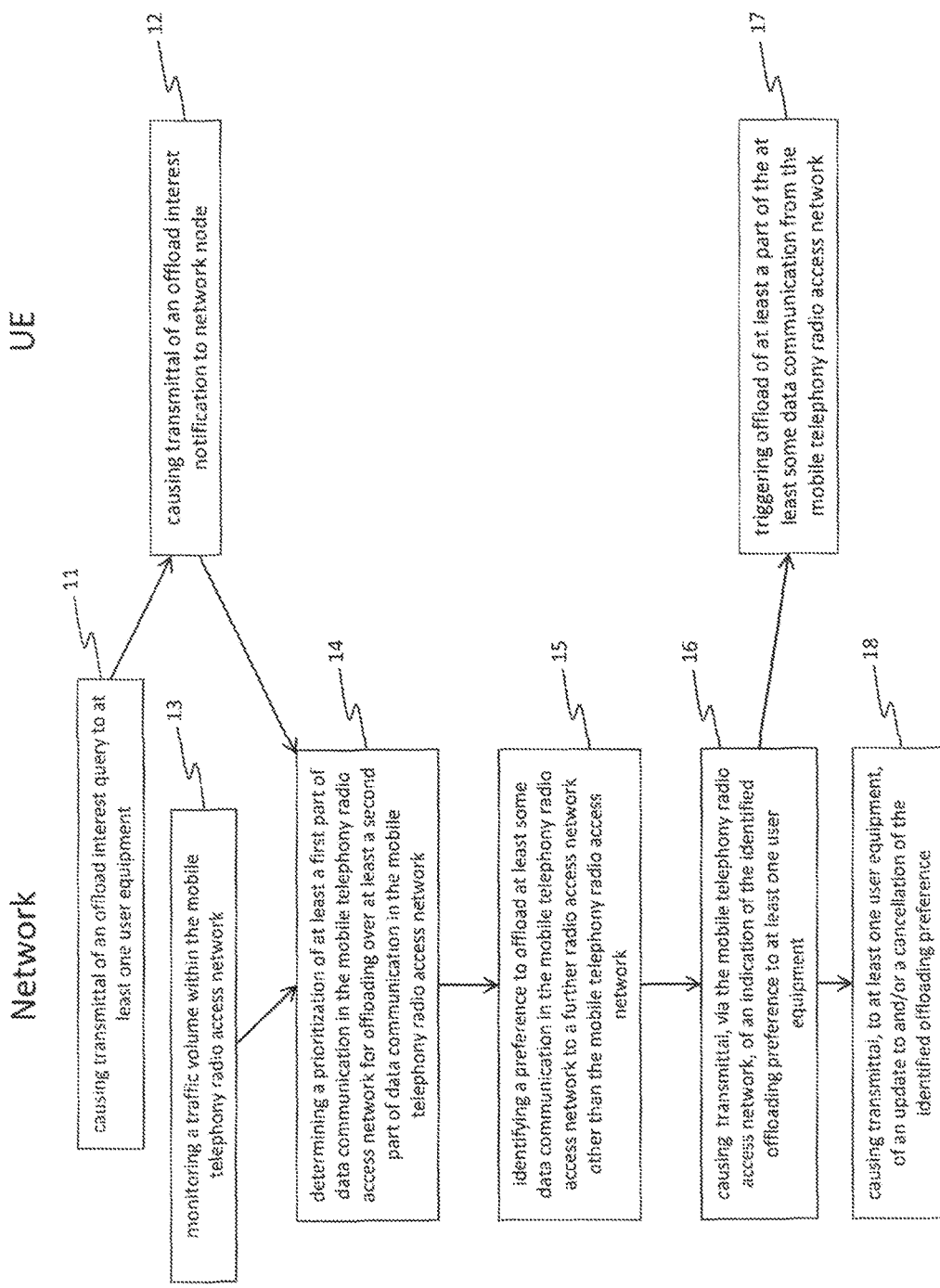
FIG. 1 shows a flow diagram according to embodiments.

Embodiments comprise measures, including methods, apparatus and computer program products, for use in access network selection in a telecommunications system. The telecommunications system comprises, at least, a mobile telephony radio access network. At a network node of the mobile telephony radio access network, a preference, to offload at least some data communication in the mobile telephony radio access network to a further radio access network other than the mobile telephony radio access network, is identified. In response to this identification, an indication of the identified offloading preference is caused to be transmitted, via the mobile telephony radio access network, to at least one user equipment.

A user equipment within the mobile telephony radio access network receives an indication of an identified offloading preference to offload at least some data communication in the mobile telephony radio access network to a further radio access network other than the mobile telephony radio access network. This indication of the identified offloading preference, as described above, may have been identified by and received from one or more network nodes of the mobile telephony radio access network. In response to receipt of the indication, the user equipment may trigger an offload of at least a part of the at least some data communication from the mobile telephony radio access network.

The one or more network nodes of the telephony radio access network may, for example, comprise one or more of: a base station, a node B, an evolved node B, an access point, a radio network controller, and base station controller. The mobile telephony radio access network may comprise a public land mobile network (PLMN).

The mobile telephony radio access network may comprise a 3rd Generation Partnership Project (3GPP) radio access network and the further radio access network may comprise a non-3GPP radio access network.

For example, in embodiments, the mobile telephony radio access network may comprise a Universal Mobile Telecommunications System Terrestrial Radio Access Network (UTRAN) and/or an Evolved Universal Mobile Telecommunications System Terrestrial Radio Access Network (E-UTRAN). The further radio access network may comprise one or more of: a Wi-Fi network, a WiMax network, a further mobile telephony radio access network, and a CDMA2000 network.

By use of embodiments, the mobile telephony radio access network (or 'cellular network') is able to indicate to the user equipment (UE) a preference for at least some data communication in the mobile telephony radio access network to be offloaded to a further network. In response, the UE may trigger offloading of the at least a part of the preferred data communication. This offloading may reduce the amount of data communications on the mobile telephony radio access network and thereby relieve, for example, congestion on the network. Embodiments therefore assist the UE in understanding the network situation and thereby may encourage the triggering of offloading at appropriate times. The UE may make the decision on whether to offload and any offloading method to be used.

In embodiments, the radio access network, e.g. a E-UTRAN or UTRAN, indicates to a UE its preference for the UE to offload data (e.g., certain IP flows(s), bearer(s) etc.) to a non-3GPP access network.

Note that the absence of any indication of an offloading preference does not inhibit other offloading mechanisms, such as policy based offloading mechanisms, but rather compliments such mechanisms by providing guidance as to appropriate situations for offloading. Equally, the UE is not mandated to trigger an offload upon receipt of the indication of preference. Rather, it should be noted that it is up to a UE to trigger offloading via a non-3GPP access network regardless of whether the mobile telephony radio access network has indicated its preference to the UE or not. As such, embodiments complement earlier specified CN based 3GPP and non-3GPP based RAT interworking, and allow the reusing of existing WLAN interworking mechanisms.

In embodiments, a traffic volume within the mobile telephony radio access network may be monitored. The identifying of the preference (for offloading) may subsequently be based, at least in part, on the monitoring. The monitoring may comprises determining whether the traffic volume is above a predetermined threshold.

Accordingly, high traffic volumes, i.e. congestion, may be avoided by offloading data communication to other networks. This can be contrasted with known systems in which offloading is controlled by policy from the CN and by the UE, and therefore in which traffic volume in the radio access network is not taken into account. As such, known systems are unable to trigger offloading for the purpose of handling congestion in the radio access network. Moreover, by identifying the offloading preference at a node in the radio access network, a real-time offloading hint may be provided to the UE.

In embodiments, the one or more network nodes may determine a prioritization of at least a first part of data communication in the mobile telephony radio access network for offloading over at least a second part of data communication in the mobile telephony radio access network. The identified preference may be based, at least in part, on this prioritization.

Data indicative of this prioritization may be received from a network node within a core network part of the telecommunications system. This network node may comprise a packet data network gateway network node. The prioritization may be indicative of an authorisation for the at least first part to be offloaded. Alternatively or additionally, the prioritization may be indicative of a prohibition on the at least second part being offloaded. The data indicative of the prioritization may be requested by a network node in the mobile telephony radio access network from, for example, the network node of the core network.

In embodiments, a packet data network (PDN) gateway network node (PGW) send an indication, via a Mobility Management Entity (MME) to an eNB, as to which of the UE data radio bearers (DRBs) it will allow to be offloaded. This indication may be sent each time an Evolved Packet System (EPS) bearer (which includes one DRB leg) is established, or alternatively in response to a query from the eNB. Instead of indicating that certain DRBs are allowed to be offloaded, the PGW may alternatively indicate to the eNB, which DRBs should not be offloaded.

In embodiments, the prioritization may be based at least in part on an identity of at least one user equipment. As such, the at least first part may comprise data communication associated with at least a first user equipment, and the at least second part may comprise data communication associated with at least a second user equipment. In embodiments, the prioritization is based on one or more of: location information for the at least one user equipment, speed information for the at least one user equipment, mobility state estimation (MSE) information for the at least one user equipment, a number of bearers used by the at least one user equipment, types of one or more bearers used by the at least one user equipment, quality of service class identifier (QCI) information relating to the at least one user equipment, and an identity of a public land mobile network associated with the at least one user equipment.

In embodiments, the network node(s) may utilize a UE's location information, speed or Mobility State Estimation (MSE) information, amount of bearers, bearer types (e.g., Guaranteed Bit Rate (GBR) vs. non-GBR bearer), Quality of Service (QoS) Class Identifier (QCI) information, selected PLMN etc. for selecting the UEs to whom to indicate its preference.

According to embodiments, the at least some data communication comprises one or more of: at least one Internet Protocol (IP) flow between the at least one user equipment and the mobile telephony radio access network, and/or at least one bearer between the at least one user equipment and the mobile telephony radio access network. As such, the identified offloading preference may specify at least one Internet Protocol (IP) flow and/or bearer.

In such situations, the at least first part may comprise data communication associated at least one first Internet Protocol (IP) flow and/or bearer (as described above), and the at least second part comprises data communication associated with at least one second Internet Protocol (IP) flow and/or bearer.

Accordingly, in embodiments, the offloading is targeted. In particular, only one bearer or IP flow (out of many) for a UE may be offloaded, leaving other IP flows and/or bearers for that UE remaining on the mobile telephony radio access network. This ensures efficient offloading, and minimised disruption caused by the offloading. The indication may include either one or more suggestions and/or one or more restrictions for the offloading of any given bearer or IP flow.

For example, the eNB may send an indication to the UE to offload one or several of the DRBs which were authorized by the PGW and/or MME for offloading. The DRB specific indication may include a requirement for the UE to offload the complete PDN connection i.e. all DRBs associated with a given APN. The offloading of complete PDN connections may be coordinated by the evolved Session Management (eSM) protocol layer of the UE, which controls establishment and disconnection of PDN connections.

In embodiments, data indicative of a capability of at least one user equipment to support offloading, may be received. This data may be received from the at least one user equipment itself, or from a network node in the core network, for example a home location register (HLR) or similar. In an embodiment, the UE capability to support non-3GPP access network offloading is indicated to the radio access network to enable the radio access network to selectively configure UEs for its offloading preference. Thus, the at least one network node may only provide the indication of preference to user equipment which is able to trigger an offload, and does not waste signalling resources on user equipment which are unable to trigger an offload.

In embodiments, an offload interest notification may be received from at least one user equipment. The user equipment may send the offload interest notification in response to the user equipment detecting the further radio access network. The causing of transmittal of the indication of the identified offloading preference may be performed in response to receipt of the offload interest notification. Furthermore, in embodiments, an offload interest query may be caused to be transmitted to at least one user equipment. The offload interest notification may therefore be received from the at least one user equipment in response to the query. At least one of the offload interest notification, the indication of the identified offloading preference and/or the offload interest query may be caused to be transmitted to/from the user equipment via Radio Resource Control (RRC) signalling. In other words, the network may query the UE or the UE may autonomously indicate its desire/possibilities for offloading prior to or after the network has sent its offloading preference. Alternatively, the UE is able to trigger "escape" to a potentially better quality network by sending an offload interest notification in the absence of any offload interest query from the network.

Specifically, in an embodiment, the eNB may not receive an offloading authorization from the PGW and/or MME. Instead, the eNB may query an offloading interest indication from the UE. The UE may utilize any information it has available to decide how to respond to such a query, and the response may include an indication that one/all DRBs could be offloaded. The response may also identify a potential target network (WLAN), and whether any current ANDSF policies indicate such offloading target is prioritized.

In an alternative embodiment, the UE may autonomously indicate its interest/possibility for offloading. Such indication could be indicated, e.g., during a RRC connection establishment phase or during the an RRC connection. Upon change of the UE's interest/possibility for offloading, the UE may repeat its indication multiple times during an RRC connection.

Embodiments may be configured such that indication of the identified offloading preference further indicates a time period for which the preference is valid. Alternatively or additionally, the indication of the identified offloading preference may further indicate a preference for the offloaded data communication to be offloaded from the further radio access network back to the mobile telephony radio access network after an indicated time period. In other words, the network may indicate the time period during which the offloading preference is valid. In an embodiment, the network indicates whether the UE should try to return to the home network after a pre-determined time.

A confirmation of offload of at least some data communication may be received, from the at least one user equipment. The confirmation of offload may identify a further radio access network to which the at least some communication is offloaded. In other words, the network node may include a request to respond in the indication, in case a UE decides to offload one or more connections to a non-3GPP access network. Depending on the method, the UE accordingly may send a response to the eNB regarding any decision taken as to whether to offload. Alternatively, the network node may be informed by the actions of the UE, i.e. in that the UE offloads at least some data communication.

In embodiments, the indication of the identified offloading preference may be broadcast to (at least) the at least one user equipment in system information for the mobile telephony radio access network. In embodiments, the indication of the identified offloading preference may be caused to be transmitted to at least the at least one user equipment in physical layer signalling. As such, the eNB may indicate its offloading preference via physical layer signalling to a UE or a group of UEs. In an embodiment, this can be indicated via a specific fixed or configured group C-RNTI on PDCCH.

The indication of the identified offloading preference comprises a single bit indication in a System Information Block (SIB) Information Element (IE). The System Information Block (SIB) Information Element (IE) may be caused to be transmitted to at least one user equipment in a given public land mobile network (PLMN) and/or broadcasted to user equipment in the given public land mobile network (PLMN). In an alternative embodiment the eNB, NB or the like may indicate its preference via broadcast signalling, e.g., in system information in one or more System Information Blocks (SIBs). This information may comprise a one bit indication and is a kind of general network preference among all UEs within the network, e.g., within a cell. Where multiple PLMNs may exist in one RAN, the SIB may be transmitted to user equipment in one PLMN and not to other user equipment.

In embodiments, the indication of the identified offloading preference is caused to be transmitted to the at least one user equipment via Radio Resource Control (RRC) signalling. In other words, the eNB, NodeB or the like may indicate its preference via dedicated signalling, e.g., RRC signalling, to the UE.

In embodiments, data indicative of a previously identified offloading preference may be received from one or more other network nodes. Equally, in some embodiments, data indicative of the identified offloading preference may be caused to be transmitted to one or more other network nodes. Embodiment therefore enable the network preference indication to be indicated from source to target eNB during a handover procedure, e.g., in a handover request message. The network may also disable its preference by reconfiguring the UE. Therefore, the preference can be maintained through handover or other situations in which user equipment moves between networks or cells. The one or more other network nodes may be located within the mobile telephony radio access network, or may be located in a different radio access network. In addition to such transfer of offloading preferences, prioritization data, such as described above, may be transferred between network nodes.

In embodiments, an update to and/or a cancellation of the identified offloading preference is caused to be transmitted to the at least one user equipment via the mobile telephony radio access network. For example, when network conditions change (e.g. the traffic volume in the mobile telephony radio access network drops), the network may modify the offloading preference, and send the same to the UE. This may cause the UE to offload at least some data communication back to the mobile telephony radio access network. This helps ensure that the further radio access network is not overloaded, and that the mobile telephony radio access network is not underutilised.

In embodiments, after the causing of the transmittal, the one or more network nodes wait for a preconfigured event to occur before causing a further indication of an identified offloading preference to be transmitted to the at least one user equipment. In embodiments, the preconfigured event comprises one or more of: an end of a time period, an end of a Radio Resource Control (RRC) connection, an offload interest notification being received from at least one user equipment, and a handover event.

A mobile telephony radio access network may be prohibited to indicate its preference to a certain UE multiple times, e.g., within a specified or configured time period, during the same RRC connection, within the same cell, etc. This may be used to prevent a network from overloading a user equipment with offload preference indications. This may occur if a user equipment decides not to act upon a received offloading preference.

As mentioned above, prioritization of parts of the data communication may be employed according to embodiments. As such, a prioritization of at least a first part of at least some data communication in the mobile telephony radio access network for offloading to a further radio access network other than the mobile telephony radio access network over at least a second part of the at least some data communication may be determined. In embodiments, data indicative of a prioritization is provided to one or more network nodes of the mobile telephony radio access network.

In embodiments, the determining and providing are performed by a network node within a core network part of the telecommunications system. Alternatively, or additionally, the determining and providing may be performed by user equipment.

The above describes embodiments of the invention. It will be appreciated that these may be used to offer an alternative to the elaborate ANDSF framework, whilst avoiding the signalling of offloading indications related to bearers which should be retained in the 3GPP access. Equally, in cases where an ANDSF is deployed and embodiments are employed, the offloading preference indicated by the network node in the mobile telephony radio access network may be made in line with ANDSF policies, and therefore the two mechanisms may complement each other. To enable this, the prioritization described above may be made to take into account the ANDSF policies.

FIG. 1 shows a flow diagram according to embodiments. In particular, FIG. 1 depicts measures for use in access network selection in a telecommunications network where the telecommunications network comprises at least one mobile telephony radio access network and at least one radio access network other than the mobile telephony radio access network.

Items 11, 13 to 16 and 18 cover embodiments from the perspective of one or more network nodes in the mobile telephony radio access network. Items 12 and 17 cover embodiments from the perspective of user equipment. It will further be realised that not all of the items described here are required in embodiments, and as such any given item may be considered optional.

Item 11 involves a network node causing transmittal of an offload interest query to at least one user equipment. In response to this request, in item 12, the UE may cause the transmittal of an offload interest notification to the network node. It will be appreciated that in some embodiments, the UE may cause an offload interest notification to be transmitted without the query illustrated in item 11.

Alongside, or as an alternative to items 11 and 12, item 13 involves a network node monitoring a traffic volume within the mobile telephony radio access network.

Item 14 involves a network node determining a prioritization of at least a first part of data communication in the mobile telephony radio access network for offloading over at least a second part of data communication in the mobile telephony radio access network. This item may be performed by a network node in the radio access network. To assist in this determination, information may be received from either or both of the user equipment or a network node in the core network (not shown).

Item 15 involves a network node identifying a preference to offload at least some data communication in the mobile telephony radio access network to a further radio access network other than the mobile telephony radio access network.

Item 16 involves a network node causing transmittal, via the mobile telephony radio access network, of an indication of the identified offloading preference to at least one user equipment.

The identified offloading preference may be received by the UE, and in item 17 the UE may trigger the offload of at least a part of the at least some data communication from the mobile telephony radio access network Item 18 involves a network node causing transmittal to at least one user equipment of an update to and/or a cancellation of the identified offloading preference. This item may be performed at a time after item 16.

Figure 2:
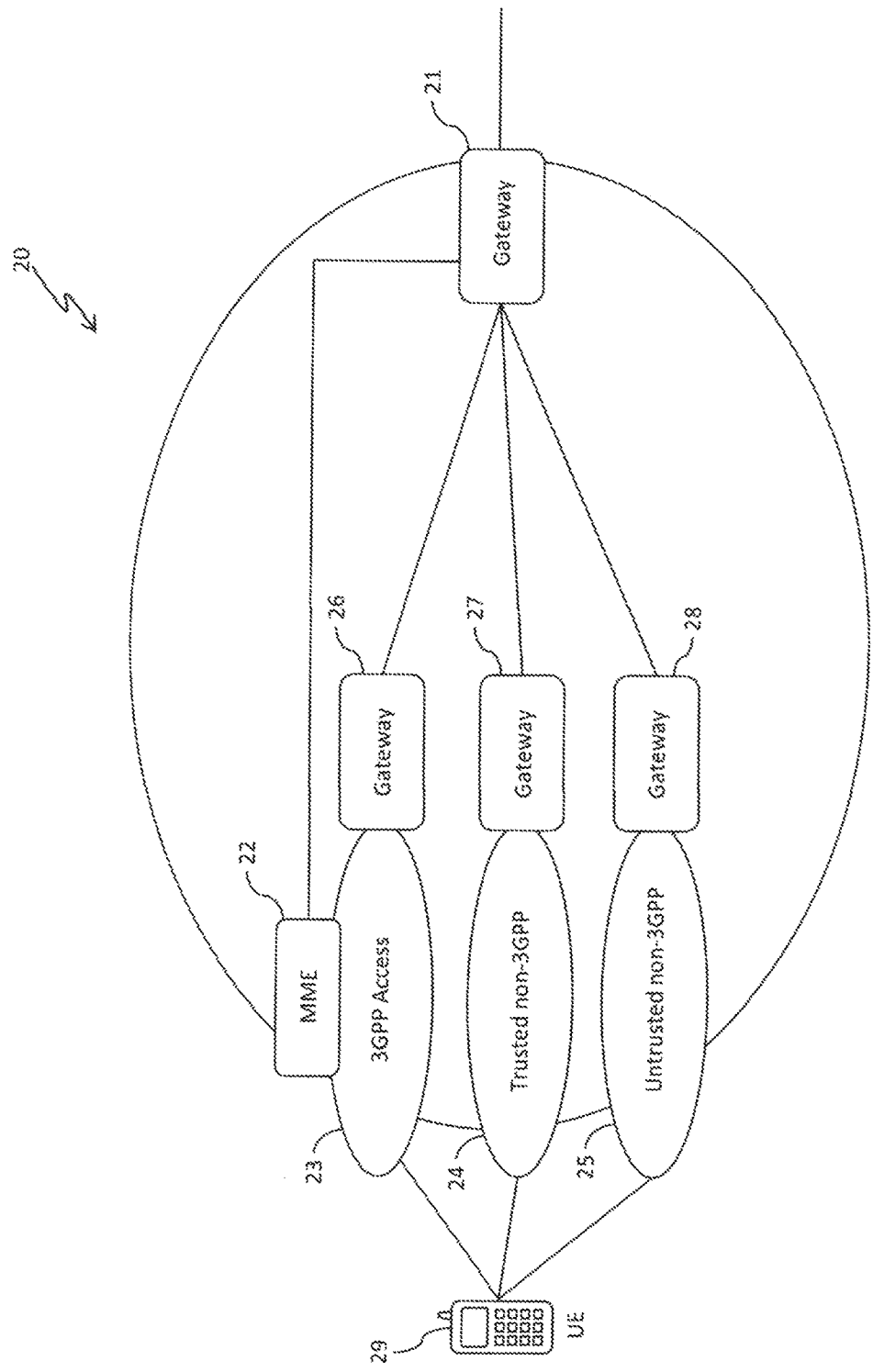
FIG. 2 is a block diagram of a telecommunications system.
Figure 3:
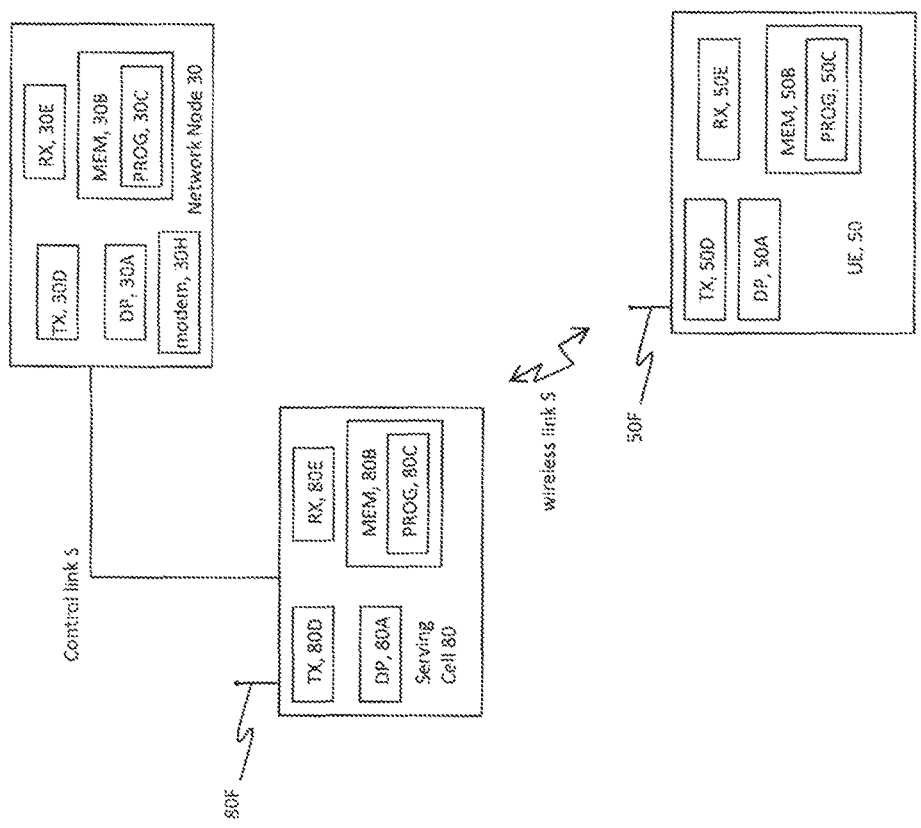
FIG. 3 is a simplified block diagram of various devices which are example electronic devices suitable for use in practising embodiments.

Reference is now made to FIGS. 2 and 3 for illustrating a simplified view of a communications system and simplified block diagrams of various electronic devices and apparatus that are suitable for use in practicing embodiments of the present invention.

In FIG. 2, a telecommunications system 20 comprises a gateway 21, through which data, incoming to the system, passes. The gateway is connected to a mobility management engine (MME) 22, and to a series of radio access networks 23, 24 and 25. The connections to each of the radio access networks 23, 24 and 25 pass through respective gateways 26, 27 and 28. User equipment (UE) 29, is connected to any or all of the radio access networks 23, 24 and/or 25.

Any or all of the radio access networks 23, 24 and/or 25 may comprise a serving cell and/or other network node(s). While these are not shown in FIG. 2, details of these elements will be described below in relation to FIG. 3.

In FIG. 3, serving cell 80 is adapted for communication over a wireless link S with a UE 50, such as a mobile terminal. Serving cell 80 may comprise a macro Node B, an eNodeB, a remote radio head, relay station, a femto cell or home NodeB, or other type of base station/cellular network access node.

UE 50 may include processing means such as a processing system and/or at least one data processor (DP) 50A, storing means such as at least one computer-readable memory (MEM) 50B storing at least one computer program (PROG) 50C, and also communicating means such as a transmitter TX 50D and a receiver RX 50E for bidirectional wireless communications with the serving cell 80 and/or any neighbouring cells (not shown) via one or more antennas 50F. Note that embodiments may be carried out by apparatus such as a modem which does not comprise an antenna.

Serving cell 80 includes its own processing means such as a processing system and/or at least one data processor (DP) 80A, storing means such as at least one computer-readable memory (MEM) 80B storing at least one computer program (PROG) 80C, and communicating means such as a transmitter TX 80D and a receiver RX 80E for bidirectional wireless communications with other devices under its control via one or more antennas 80F. There is a data and/or control path, termed at FIG. 3 as a control link S which in the 3GPP cellular system may be implemented as an Iub interface or in E-UTRAN as an S1 interface, coupling the serving cell 80 with network node (or 'entity') 30, and over which the network node 30 and the serving cell 80 may exchange control messages, such as system information update requests and/or change notifications. Network node 30 may for example comprise an RNC, MME or suchlike.

Network node 30 includes processing means such as a processing system and/or at least one data processor (DP) 30A, storing means such as at least one computer-readable memory (MEM) 30B storing at least one computer program (PROG) 30C, and communicating means such as a modem 30H for bidirectional communication with serving cell 80 over control link S and/or any neighbouring cells (not shown).

While not particularly illustrated for UE 50, serving cell 80 and network node 30, those devices are also assumed to include as part of their wireless communicating means a modem which may be inbuilt on a RF front end chip within those devices 50, 80, 30 and which chip also carries the TX 50D/80D/30D and the RX 50E/80E/30E.

Various embodiments of UE 50 can include, but are not limited to: cellular telephones (or 'mobile' telephones) including so-called smartphones; data cards, USB dongles, laptop computers, personal portable digital devices having wireless communication capabilities including but not limited to laptop/palmtop/tablet/phablet computers, digital cameras and music devices, and Internet appliances.

At least one of the PROGs 50C in UE 50 is assumed to include program instructions that, when executed by the associated DP 50A, enable the device to operate in accordance with embodiments of the present invention, as detailed above. Serving cell 80 and network node 30 also have software stored in their respective MEMS to implement certain aspects of these teachings. In these regards, embodiments of this invention may be implemented at least in part by computer software stored on the MEM 50B, 80B, 30B which is executable by the DP 50A of UE 50, DP 80A of serving cell 80 and/or DP 30A of network node 30, or by hardware, or by a combination of tangibly stored software and hardware (and tangibly stored firmware). Electronic devices implementing these aspects of the invention need not be the entire devices as depicted at FIG. 3, but embodiments may be implemented by one or more components of same such as the above described tangibly stored software, hardware, firmware and DP, or a system on a chip SOC, an application specific integrated circuit ASIC or a digital signal processor DSP.

Various embodiments of the computer readable MEMs 50B, 80B and 30B include any data storage technology type which is suitable to the local technical environment, including but not limited to semiconductor based memory devices, magnetic memory devices and systems, optical memory devices and systems, fixed memory, removable memory, disc memory, flash memory, DRAM, SRAM, EEPROM and the like. Various embodiments of the DPs 50A, 30A and 80A include but are not limited to general purpose computers, special purpose computers, microprocessors, digital signal processors (DSPs) and multi-core processors.

The above embodiments are to be understood as illustrative examples of the invention. Further embodiments of the invention are envisaged.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

3GPP 3rd Generation Partnership Project
ANDSF Access Network Discovery and Selection Function
AP Access Point
APN Access Point Name
CN Core Network
C-RNTI Cell Radio Network Temporary Identifier
eNB Evolved Node B
EPS Evolved Packet System
E-UTRAN Evolved Universal Terrestrial Radio Access Network
GBR Granted Bit Rate
HSS Home Subscriber Server
IE Information Element
LR Location Registration
LU Location Update
MME Mobility Management Entity
MSE Mobility State Estimation
NAS Non Access Stratum
NB Node B
OPEX Operational Expenditure
PCRF Policy and Charging Rules Function
PDCCH Physical Downlink Control Channel
PDN Packet Data Network
PGW PDN Gateway
PLMN Public Land Mobile Network
QCI Qos Class Identifier
QoS Quality of Service
RAT Radio Access Technology
RAU Routing Area Update
RNC Radio Network Controller
SIB System Information Block
SMS Short Message Service
TAU Tracking Area Update
TS Technical Specification
UE User Equipment
UMTS Universal Mobile Telecommunications System
UTRAN Universal Terrestrial Radio Access Network
WLAN Wireless Local Area Network

The invention claimed is:

1. A method for use in access network selection in a telecommunications system comprising at least a mobile telephony radio access network, the method comprising:
   monitoring, by circuitry of a network node of the mobile telephony radio access network, a traffic volume within the mobile telephony radio access network;
   determining, by the circuitry, whether the traffic volume exceeds a predetermined threshold;
   identifying, by the circuitry and based on the determining, a preference to offload specific internet protocol (IP) flows of data communication in the mobile telephony radio access network to an available local area network;
   transmitting, by the circuitry to a user equipment via the mobile telephony radio access network, an indication of the identified preference, the indication including at least one condition that, when satisfied, the user equipment is to offload the data communication; and
   offloading, by the user equipment when the at least one condition is satisfied, the specific IP flows of the data communication without offloading other IP flows of the data communication.

2. The method according to claim 1, wherein said data communication further comprises any of:
   a bearer between said user equipment and said mobile telephony radio access network,
   a packet data network (PDN) connection between said user equipment and said mobile telephony radio access network, and
   communication associated with at least a first public land mobile network (PLMN).

3. The method according to claim 1, further comprising:
   determining, by the circuitry, a prioritization of at least a first part of the data communication in the mobile telephony radio access network for offloading over at least a second part of the data communication in the mobile telephony radio access network, wherein
   the identifying of the preference is based on the prioritization.

4. The method according to claim 3, wherein the prioritization is at least one of:
   indicative of an authorization of said at least first part to be offloaded;
   indicative of a prohibition on said at least second part being offloaded; and
   based at least in part on an identity of the user equipment.

5. The method according to claim 3, further comprising:
   receiving, by the circuitry, an offload interest notification from the user equipment, wherein
   the circuitry transmits the indication in response to receipt of the offload interest notification.

6. The method according to claim 5, wherein said indication comprises a single bit indication in a System Information Block (SIB) Information Element (IE).

7. The method according to claim 1, wherein when the at least one condition is satisfied, the user equipment initiates a process to offload the data communication to the available local area network.

8. The method according to claim 1, wherein
   the data communication corresponds to a particular data radio bearer, and
   the method further comprises authorizing, by the circuitry, the particular data radio bearer for data offloading.

9. An apparatus for use in access network selection in a telecommunications system comprising at least a mobile telephony radio access network, the apparatus configured for use in a network node of the mobile telephony radio access network, the apparatus comprising:

circuitry configured to
monitor a traffic volume within the mobile telephony radio access network;
determine whether the traffic volume exceeds a predetermined threshold;
identify, based on whether the traffic volume exceeds the predetermined threshold, a preference to offload specific internee protocol (IP) flows of data communication in the mobile telephony radio access network to an available local area network; and
transmit, to a user equipment via the mobile telephony radio access network, an indication of the identified preference, the indication including at least one condition that, when satisfied, the user equipment is to offload the data communication, wherein the user equipment offloads, when the at least one condition is satisfied, the specific IP flows of the data communication without offloading other IP flows of the data communication.

10. The apparatus according to claim 9, wherein the network node comprises one or more of the following:
a base station,
a node B,
an evolved node B,
an access point,
a radio network controller, and
a base station controller.

11. An apparatus for use in access network selection in a telecommunications system comprising at least a mobile telephony radio access network, the apparatus configured for use in a user equipment within the mobile telephony radio access network, the apparatus comprising:
circuitry configured to receive, from a network node of the mobile telephony radio access network, an indication of an identified preference to offload specific Internet protocol (IP) flows of data communication in the mobile telephony radio access network to an available local area network, wherein
the network node monitors a traffic volume within the mobile telephony radio access network and determines whether the traffic volume exceeds a predetermined threshold,
the indication of the identified preference is identified by the network node based on whether the traffic volume exceeds the predetermined threshold,
the indication includes at least one condition that, when satisfied, the user equipment is to offload the data communication, and
the circuit is further configured to offload, when the at least one condition is satisfied, the specific IP flows of the data communication without offloading other IP flows of the data communication.

12. The apparatus according to claim 11, wherein the circuitry is configured to, in response to receipt of said indication, offload at least a part of the data communication from the mobile telephony radio access network to the available local area network.

13. The apparatus according to claim 11, wherein the circuitry is configured to:
determine a prioritization of at least a first part of the data communication in the mobile telephony radio access network for offloading over at least a second part of the data communication in the mobile telephony radio access network; and
transmit the prioritization to the network node.

14. The apparatus according to claim 11, wherein the circuitry is further configured to:
receive an offload interest query from the network node;
transmit an offload interest notification to the network node in response to the offload interest query;
detect said available local area network; and
transmit the offload interest notification in response to detection of the available local area network.

15. The apparatus according to claim 11, wherein the circuitry is further configured to transmit a confirmation of offload of the at least some data communication, the confirmation identifying the available local area network to which the at least some data communication is offloaded.

16. The apparatus according to claim 11, wherein the circuitry is further configured to receive, via the mobile telephony radio access network, an update to and/or a cancellation of the identified preference.

17. The apparatus according to claim 11, wherein
the mobile telephony radio access network comprises a 3rd Generation Partnership Project (3GPP) radio access network, and
the local area network comprises a non-3GPP radio access network.

18. The apparatus according to claim 11, wherein the local area network comprises one or more of:
a Wi-Fi network,
a WiMax network,
a further mobile telephony radio access network, and
a CDMA 2000 network.

19. The apparatus according to claim 11, wherein said mobile telephony radio access network comprises one or more of Universal Mobile Telecommunications System Terrestrial Radio Access Network (UTRAN) and an Evolved Universal Mobile Telecommunications System Terrestrial Radio Access Network (E-UTRAN).

* * * * *